(12) United States Patent
Sato et al.

(10) Patent No.: US 11,582,394 B2
(45) Date of Patent: Feb. 14, 2023

(54) CONTROL APPARATUS, CONTROL METHOD, AND STORAGE MEDIUM FOR PROVIDING TILT CONTROL

(71) Applicant: CANON KABUSHIKI KAISHA, Tokyo (JP)

(72) Inventors: Natsuko Sato, Yokohama (JP); Ryo Kawasaki, Yokohama (JP); Shunsuke Chino, Wako (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/004,915

(22) Filed: Aug. 27, 2020

(65) Prior Publication Data

US 2021/0067702 A1 Mar. 4, 2021

(30) Foreign Application Priority Data

Aug. 29, 2019 (JP) .............................. JP2019-156348

(51) Int. Cl.
*G02B 7/09* (2021.01)
*H04N 5/232* (2006.01)
*G02B 7/28* (2021.01)

(52) U.S. Cl.
CPC ......... *H04N 5/23299* (2018.08); *G02B 7/287* (2013.01); *H04N 5/23212* (2013.01)

(58) Field of Classification Search
CPC ............. H04N 5/2253; H04N 5/23206; H04N 5/232127; H04N 5/23218; H04N 5/23299; H04N 5/232123; H04N 5/23212; H04N 5/2259; G02B 27/0068; G02B 7/09; G02B 7/287; G03B 5/08; G03B 3/02; G03B 5/06; G03B 13/32; G03B 13/30; G03B 5/04; G01B 11/26
See application file for complete search history.

(56) References Cited

U.S. PATENT DOCUMENTS

| | | | |
|---|---|---|---|
| 6,359,650 B1 * | 3/2002 | Murakami ....... | H04N 5/232945 348/333.04 |
| 2007/0071429 A1 * | 3/2007 | Woehler ............... | H04N 5/2259 396/89 |
| 2017/0272658 A1 * | 9/2017 | Ito .......................... | G03B 13/02 |
| 2018/0332236 A1 * | 11/2018 | Glaser .................. | H04N 5/2254 |
| 2019/0228195 A1 * | 7/2019 | Lozano ................... | G06T 7/521 |

(Continued)

FOREIGN PATENT DOCUMENTS

| JP | 2010130633 A | * | 6/2010 |
|---|---|---|---|
| JP | 2017-173802 A | | 9/2017 |
| JP | 2010-130633 A | | 6/2020 |

*Primary Examiner* — Patrick E Demosky
(74) *Attorney, Agent, or Firm* — Carter, DeLuca & Farrell LLP

(57) ABSTRACT

A control apparatus includes a tilt driving unit configured to tilt at least one of an image sensor and an imaging optical system relative to a plane orthogonal to an optical axis, a focus driving unit configured to perform focus driving by moving a focus lens that constitutes at least part of the imaging optical system in an optical axis direction, and a controlling unit configured to control the focus driving unit and the tilt driving unit so as to adjust a focal plane to a predetermined surface. The controlling unit moves the focal plane in a vertical direction to the focal plane while maintaining the focal plane substantially parallel to the predetermined plane.

12 Claims, 11 Drawing Sheets

(56) References Cited

U.S. PATENT DOCUMENTS

2019/0349530 A1* 11/2019 Niga ................... H04N 5/23203
2020/0137313 A1   4/2020 Sato et al.
2020/0191563 A1   6/2020 Sato
2020/0296296 A1   9/2020 Chino et al.
2021/0185198 A1*  6/2021 Attar ...................... H04N 5/332

* cited by examiner

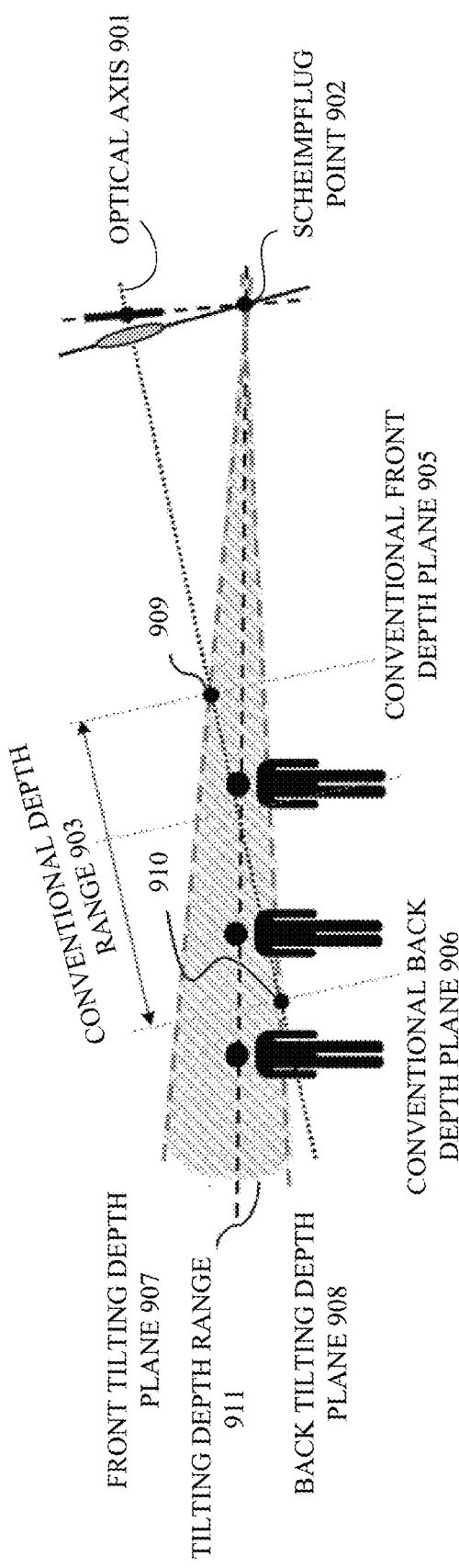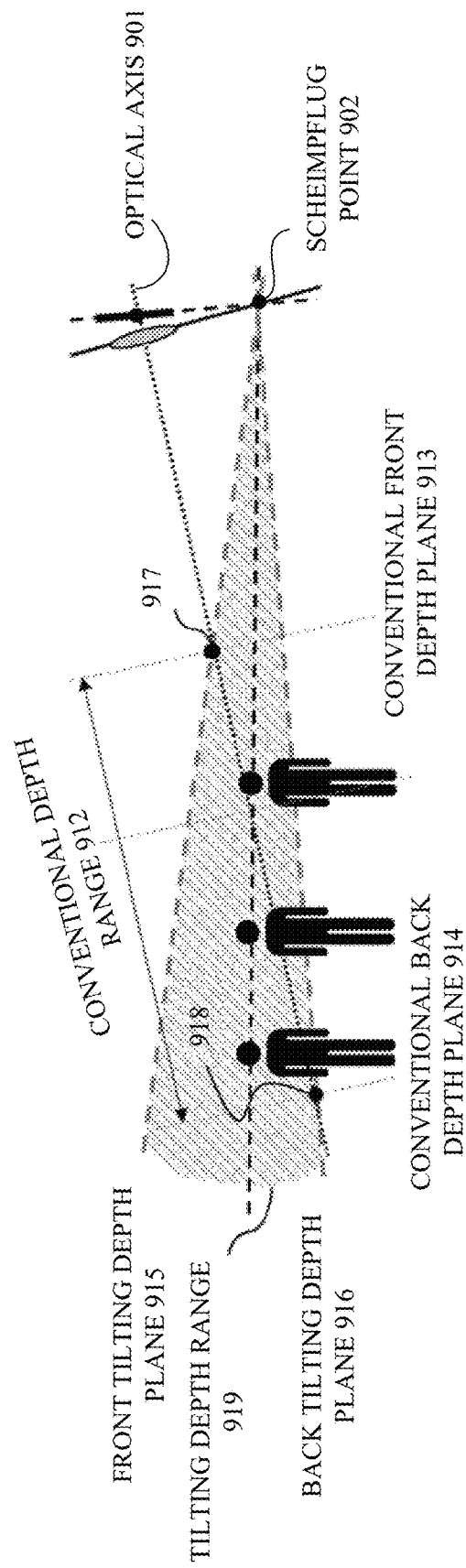
FIG. 9A
FIG. 9B

CONTROL APPARATUS, CONTROL METHOD, AND STORAGE MEDIUM FOR PROVIDING TILT CONTROL

BACKGROUND OF THE INVENTION

Field of the Invention

The present invention relates to a control apparatus that provides a tilt control.

Description of the Related Art

Surveillance cameras have recently been installed at high places to monitor and photograph pedestrians on a road, a station platform, or the like. Cameras for the surveillance applications are demanded to obtain images with a deep depth of field. For this demand, one known method (Scheimpflug principle) adjusts a surface (focal plane) to be focused in order to obtain an image with a deep depth of field through a control (tilt control) that tilts an imaging plane relative to an imaging optical-axis plane orthogonal to an imaging optical axis used to capture an object image.

During the tilt control, blurring occurs in a direction orthogonal to the focal plane. Thus, when the focal plane is adjusted so that the ground (road) is in focus, the height of the face of the pedestrian on the road is blurred. Hence, the tilt control needs to control the position of the focal plane in the vertical direction.

Japanese Patent Laid-Open No. ("JP") 2010-130633 discloses an image pickup apparatus that obtains a tilt angle of a camera, focal length information, and object distance information, calculates a tilt angle of an image sensor without inputting parameters, and performs an automatic tilt control. JP 2017-173802 discloses an image pickup apparatus that performs a tilt control using a tilt angle calculated based on focus shift amounts in a plurality of focus detecting areas.

However, the image pickup apparatus disclosed in JP 2010-130633 cannot move the focal plane in the direction vertical to the focal plane. The image pickup apparatus disclosed in JP 2017-173802 may not be able to properly conduct a focus detection for a moving object. In order to move the focal plane in the vertical direction, the tilting control needs to move the focal plane in the vertical direction relative to a reference plane in consideration of respective driving speeds of the focus lens and the image sensor.

SUMMARY OF THE INVENTION

The present invention provides a control apparatus, a control method, and a storage medium, each of which can move a focal plane in a vertical direction while keeping a reference plane and the focal plane parallel to each other.

A control apparatus according to one aspect of the present invention includes a tilt driving unit configured to tilt at least one of an image sensor and an imaging optical system relative to a plane orthogonal to an optical axis, a focus driving unit configured to perform focus driving by moving a focus lens that constitutes at least part of the imaging optical system in an optical axis direction, and a controlling unit configured to control the focus driving unit and the tilt driving unit so as to adjust a focal plane to a predetermined surface. The controlling unit moves the focal plane in a vertical direction to the focal plane while maintaining the focal plane substantially parallel to the predetermined plane. A control method and a storage medium storing a program corresponding to the above control apparatus also constitute another aspect of the present invention.

Further features of the present invention will become apparent from the following description of exemplary embodiments with reference to the attached drawings.

BRIEF DESCRIPTION OF THE DRAWINGS

FIGS. 9A and 9B illustrate a relationship between a conventional depth range and a tilting depth range according to the second embodiment.

DESCRIPTION OF THE EMBODIMENTS

Referring now to the accompanying drawings, a detailed description will be given of embodiments according to the present invention.

Overall Structure

Figure 1:
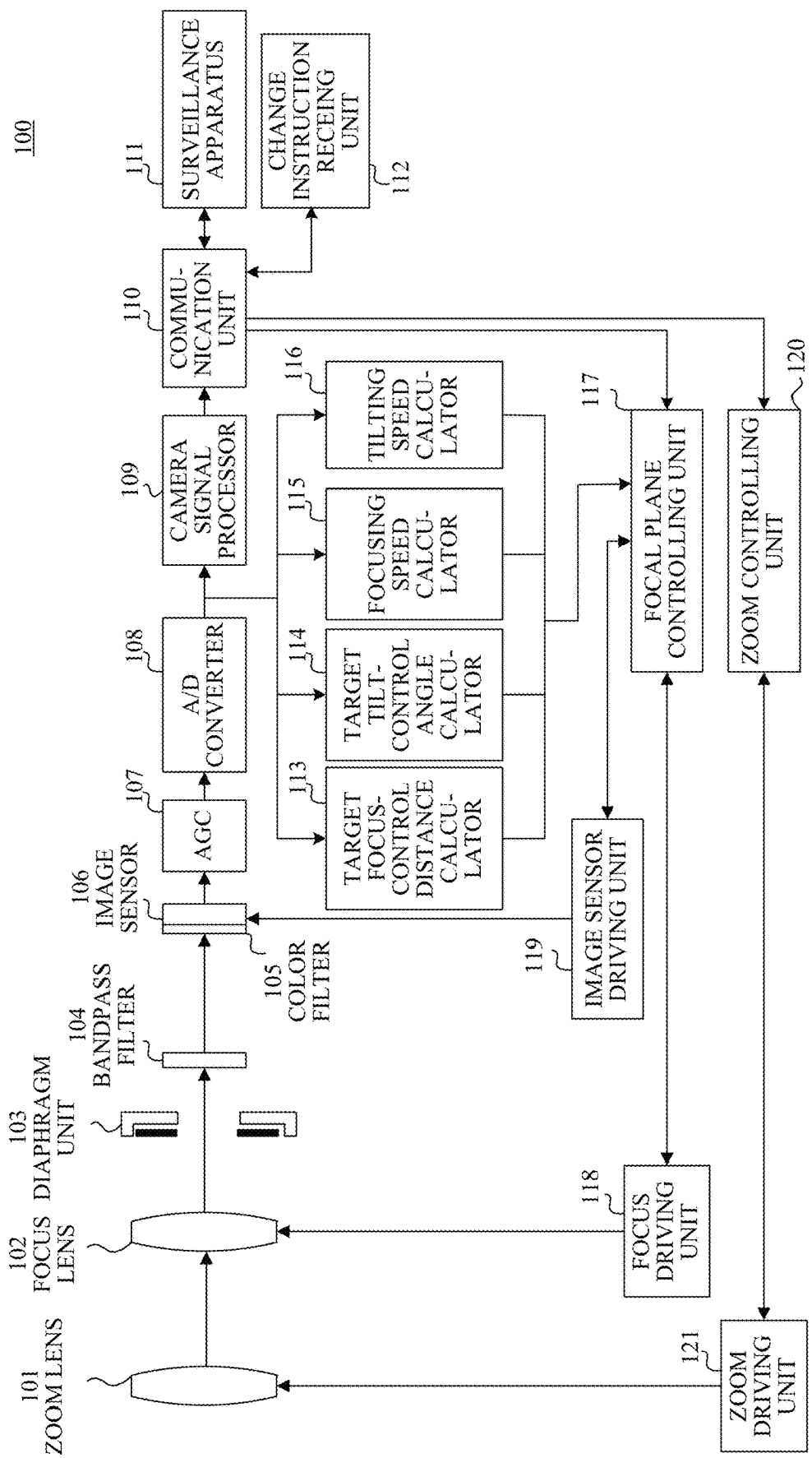
FIG. 1 is a block diagram of an image pickup apparatus according to each embodiment.

Referring now to FIG. 1, a description will now be given of a configuration of an image pickup apparatus 100 according to this embodiment. FIG. 1 is a block diagram of the image pickup apparatus 100. In this embodiment, an image pickup apparatus body and an imaging optical system (lens apparatus) are integrated with each other in the image pickup apparatus 100. However, the present invention is not limited to this embodiment, and is also applicable to an image pickup system including an image pickup apparatus body and a lens apparatus detachable from the image pickup apparatus body. In this case, a focusing speed calculator (or focusing speed calculation unit) 115, a tilting speed calculator (tilting speed calculation unit) 116, a focal plane controlling unit 117 (controlling unit or focal plane control unit), and the like, which will be described later, may be provided in either the image pickup apparatus body or the lens apparatus.

A zoom lens 101 moves in an optical axis direction and changes a focal length. The focus lens 102 moves in the optical axis direction during focusing. A diaphragm unit (aperture stop unit) 103 adjusts a light amount. The imaging optical system according to this embodiment includes the zoom lens 101, the focus lens 102, and the diaphragm unit 103. However, the present invention is not limited to this embodiment, and may be an imaging optical system that does not include at least one of the zoom lens 101, the focus lens 102, and the diaphragm unit 103.

Light that has passed through the imaging optical system forms an object image as an optical image on an image sensor 106 via a bandpass filter (BPF) 104 and a color filter 105. The BPF 104 is movable to and from the optical path of the imaging optical system. An image sensor 106 has a CMOS sensor or the like, and photoelectrically converts the object image formed via the imaging optical system and outputs an analog electric signal (captured image). An AGC 107 controls a gain of an analog electric signal output from the image sensor 106. An A/D converter 108 converts the analog electric signal into a digital signal (digital imaging signal) and outputs the digital signal to a camera signal processor 109.

The camera signal processor 109 performs various image processing for the digital imaging signal and generates a video signal. The video signal is output to a surveillance apparatus 111 connected to the image pickup apparatus 100 by wire or wireless communications via a communication unit 110. The communication unit 110 receives a command (instruction) from an external device and outputs a control signal, such as a command, to the focal plane controlling unit 117 and a zoom controlling unit 120.

A change instruction receiving unit 112 accepts a focal plane change instruction (shift change instruction), which is one of the commands from the external device. The focal plane is not a plane that is in focus when focusing is made by the focus lens, but a plane that is in focus when the optical system or the image sensor 106 is tilted. The front and back (up and down) of the focal plane are within the depth of field, and the object located in this range is in focus. The change instruction is to change (shift) the position of the focal plane in a substantially vertical direction to the reference plane (or surface) (predetermined plane, such as the ground surface). The target focus-control distance calculator 113 and the target tilt-control angle calculator 114 respectively calculate the position of the focus lens 102 for the focal-plane changing control and the tilt angles of the optical system or the image sensor 106. The focusing speed calculator 115 and the tilting speed calculator 116 move the focal plane in the substantially vertical direction while maintaining the focal plane parallel to the reference plane, and thus calculate the focusing speed (or focus driving speed) and the tilting speed (or tilt driving speed) according to the shift amount.

The focal plane controlling unit 117 acquires the instruction from the communication unit 110 and the calculation results by the target focus-control distance calculator 113, the target tilt-control angle calculator 114, the focusing speed calculator 115, and the tilting speed calculator 116. Then, based on the instruction and the calculation result, the focal plane controlling unit 117 instructs a focus driving unit 118 and an image sensor driving unit (tilt driving unit) 119 in a focus setting position, a tilt angle setting position, a focus setting speed, and a tilt setting speed. The zoom controlling unit 120 instructs a zoom driving unit 121 in the zoom setting position based on the instruction from the communication unit 110.

The focus driving unit 118 drives the focus lens 102 in accordance with the focus setting position and the focus setting speed instructed by the focal plane controlling unit 117. The image sensor driving unit 119 drives (or tilts) the image sensor 106 in accordance with the tilt angle setting position and the tilt setting speed instructed by the focal plane controlling unit 117. The zoom controlling unit 120 drives the zoom lens 101 in accordance with the zoom setting position designated by the zoom controlling unit 120. This embodiment uses the image sensor driving unit 119 as the tilt driving unit for tilt driving, but is not limited to this example and may use the tilt driving unit that drives the imaging optical system for tilt driving. In other words, the tilt driving unit changes the slope of at least one of the image sensor 106 and the imaging optical system (the angle between the imaging plane of the image sensor 106 and the principal plane of the imaging optical system), and performs tilt driving.

Figure 2:
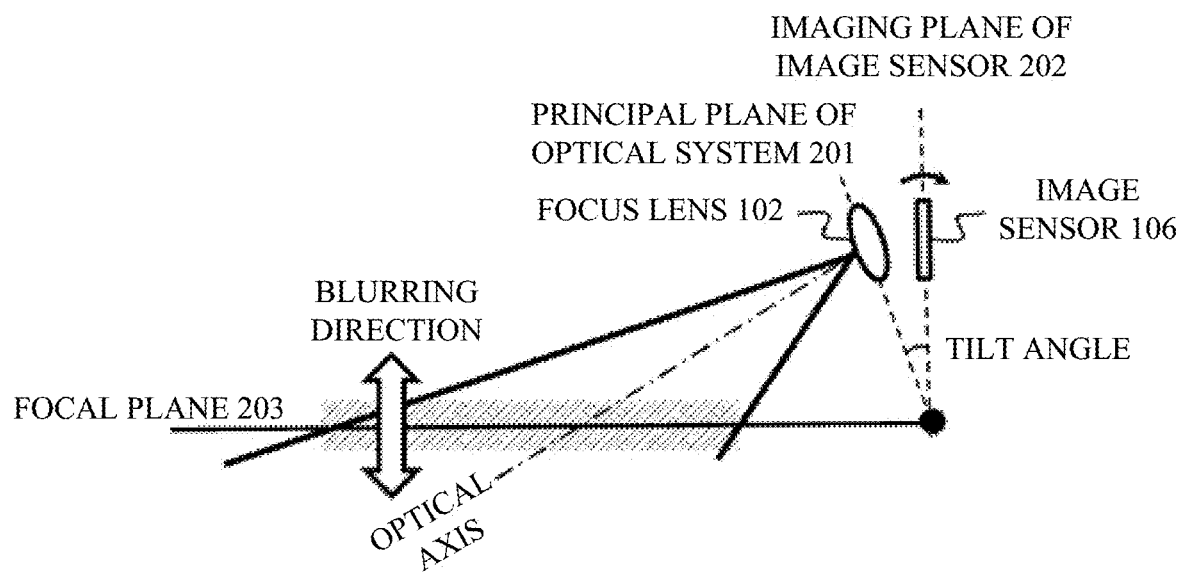
FIG. 2 explains a tilt control according to each embodiment.

The tilt control is to adjust an in-focus plane (focal plane) to a plane such as the ground plane by tilting the imaging plane relative to the imaging optical axis plane (plane orthogonal to the optical axis) that is orthogonal to the imaging optical axis used to capture an object image (for example, by tilting the imaging optical system or the image sensor 106). The tilt control will be described with reference to FIG. 2. FIG. 2 explains the tilt control, and shows that the image sensor 106 is tilted to the plane orthogonal to the optical axis. The principle of this control is called the Scheimpflug principle, in which when a principal plane 201 of the optical system and an imaging plane 202 of the image sensor 106 intersect one straight line, a focal plane 203 also intersects the same straight line. When the image sensor 106 has a predetermined tilt angle, the depth increases in the optical axis direction of the image pickup apparatus 100, but blurring occurs in a direction substantially orthogonal to the focal plane 203 (a blur direction in FIG. 2). Thus, which position the focal plane 203 is to be adjusted to in the substantially vertical direction (blurring direction) to the focal plane 203 during the tilt control becomes important.

Figure 3:
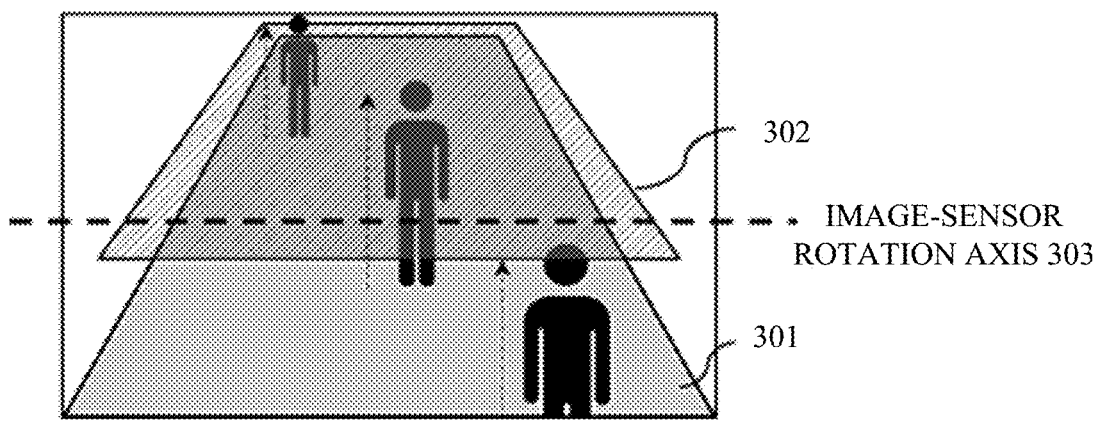
FIG. 3 explains shifting of a focal plane according to each embodiment.

Referring now to FIG. 3, a description will be given of the focal plane change (shift change). FIG. 3 explains the shift change of the focal plane. As illustrated in FIG. 3, in a scene where persons stand side by side in a deep passage, if the focal plane is a plane 301 corresponding to the height of the ground, the height of the person's face may be blurred. Accordingly, by shifting the focal plane to a plane 302 corresponding to the height of the person's face, it is possible to obtain an image with a long depth of field in the face area to be addressed.

The reason why the plane 302 corresponding to the person's face height cannot be in focus in advance is that there is no object at the height to be focused on an image-sensor rotation axis 303 or no focus control is available based on the contrast evaluation value or the like. On the other hand, since the object exists on the image-sensor rotation axis 303 on the plane 301 corresponding to the ground height, it is possible to form the focal plane relatively easily. Hence, in the shift change control of the focal plane, the focus lens 102 may have to be controlled at a distance where there is no object or at a distance outside the angle of view. Then, it is necessary to calculate the target focus-control distance using a parameter that can be acquired from the image, and to perform the focus control based on the calculation result.

Figure 4:
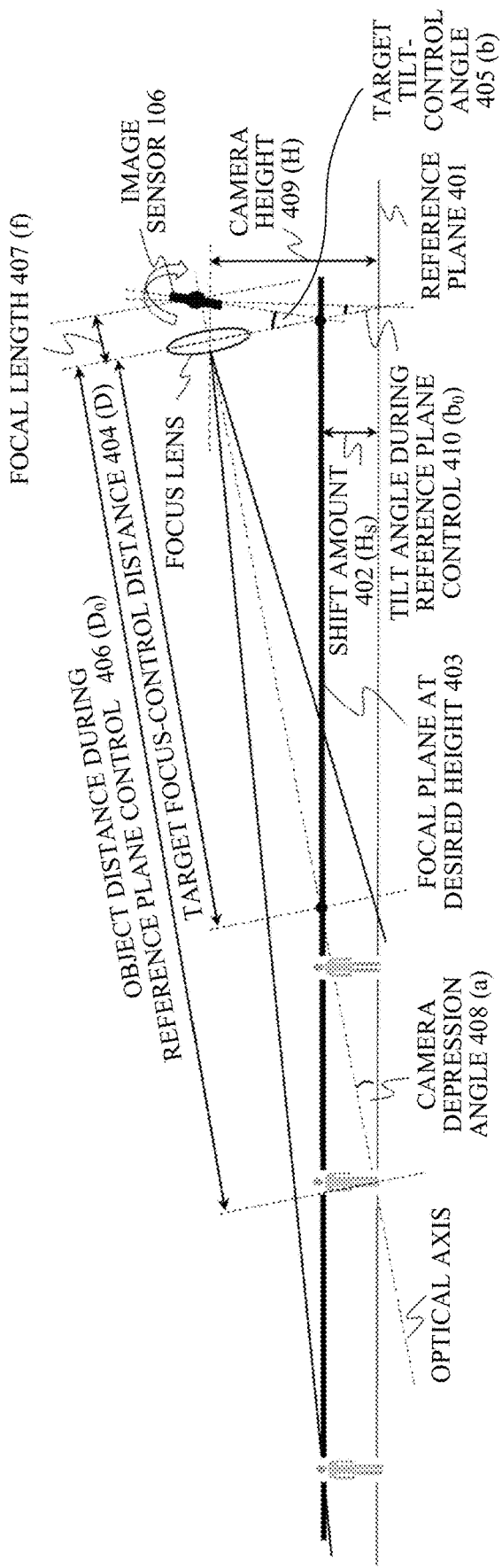
FIG. 4 explains a calculation of a shift change according to each embodiment.

Referring now to FIG. 4, a description will be given of a method of calculating the shift change of the focal plane in the tilt control. FIG. 4 explains a calculation of the shift change. A focal plane 403 at a desired height is obtained by moving the focal plane substantially parallel to a reference plane 401 with a gap of an arbitrary shift amount 402 (Hs) in a direction substantially orthogonal to the reference plane 401. In order to obtain the focal plane 403 at the desired height, it is necessary to control the focus lens 102 to a target focus-control distance 404(D) and the image sensor 106 to a target tilt-control angle 405($b$). The target focus-control distance 404(D) and the target tilt-control angle 405(b) are calculated with the following expressions (1) and (2), respectively.

$$D = D_0 - \frac{H_s}{\sin a} = \frac{(H - H_s)D_0}{H} \quad (1)$$

$$b = \tan^{-1}\left(\frac{f}{D \tan a}\right) = \tan^{-1}\left(\frac{f\sqrt{D_0^2 - H^2}}{D_0(H - H_s)}\right) \quad (2)$$

$D_0$ is an object distance 406 during a reference plane control, f is a focal length 407, "a" is a camera depression angle 408, and H is a camera height 409. The object distance 406 during the reference plane control may be obtained by converting information obtained from a lens (optical system) during autofocusing (AF) at the image center may be converted into a distance, or by using a value acquired by an external focus detecting sensor. The focal length 407 may use information obtained from the lens. The camera depression angle 408 and the camera height 409 can be acquired by focusing on the reference plane. A relationship among a tilt angle 410($b0$) during the reference plane control, a camera depression angle 408($a$), and a camera height 409(H) is expressed by the following expression (3):

$$b_0 = \tan^{-1}\left(\frac{f}{D_0 \tan a}\right) = \tan^{-1}\left(\frac{f \cos a}{H}\right) \quad (3)$$

By focusing on the reference plane, the object distance 406 during the reference plane control and the tilt angle 410 during the reference plane control can be acquired, and the camera depression angle 408 and the camera height 409 can be obtained through calculations. Herein, the method of acquiring the camera depression angle 408 and the camera height 409 by focusing on the reference plane has been shown, but the method of acquiring these parameters is not limited to this embodiment, and they may be acquired, for example, by a gyro sensor, an acceleration sensor, a geomagnetic sensor, or the like.

Figure 5B:
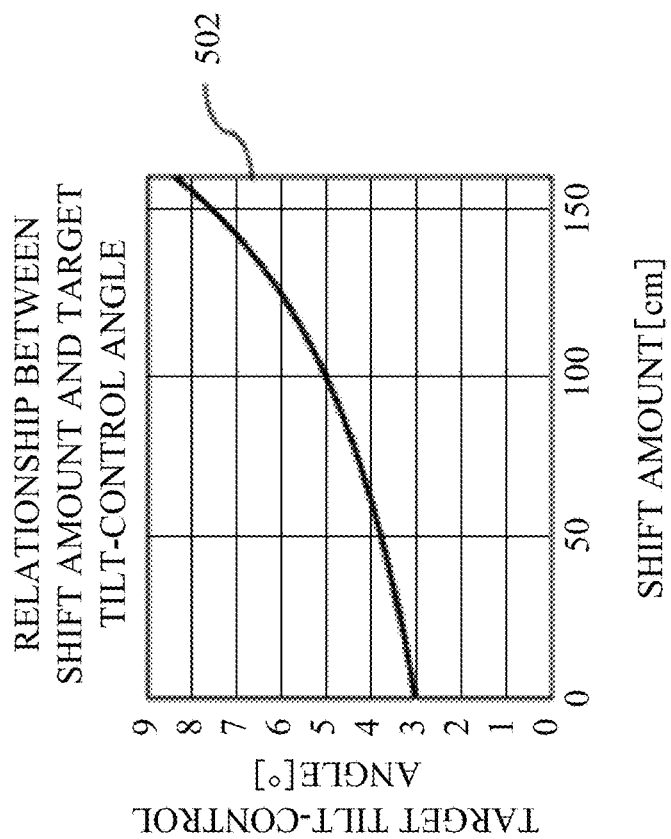
FIGS. 5A and 5B illustrate a relationship between a shift amount and a target focus-control distance and a relationship between a shift amount and a target tilt-control angle according to each embodiment.
Figure 5A:
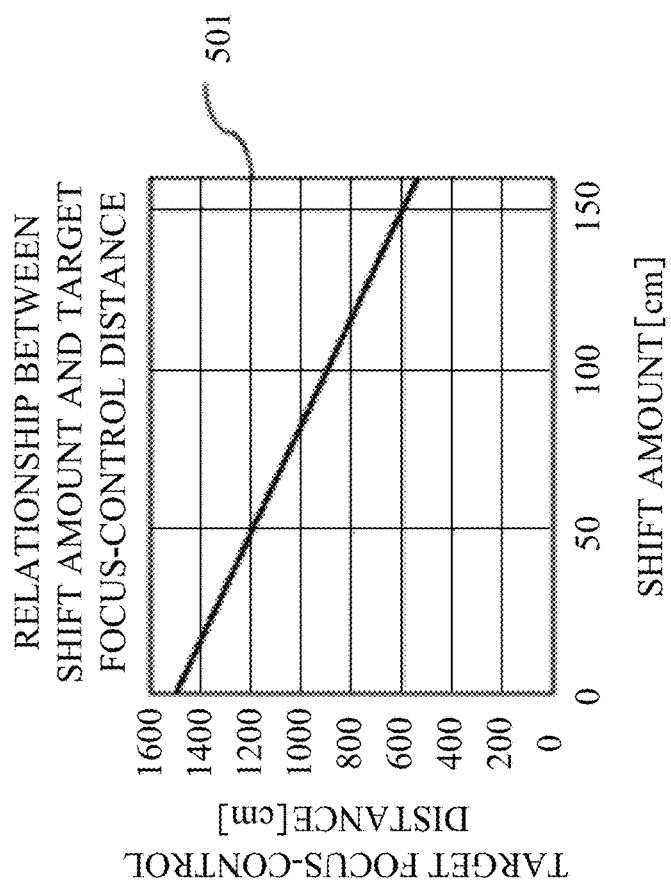

Referring now to FIGS. 5A and 5B, a description will be given of a relationship 501 between the shift amount 402 and the target focus-control distance 404 calculated by the expressions (1) and (2), and a relationship 502 between the shift amount 402 and the target tilt-control angle 405. FIG. 5A is a relationship diagram between the shift amount and the target focus-control distance, where the abscissa axis represents the shift amount (cm) and the ordinate axis represents the target focus-control distance (cm). FIG. 5B is a relationship diagram between the shift amount and the target control angle, where the abscissa axis represents the shift amount (cm) and the ordinate axis represents the target tilt-control angle (degree). FIGS. 5A and 5B show, as an example, the relationship when imaging is performed under the imaging conditions of the object distance 406 during the reference plane control is 1500 cm, the focal length 407 is 135 mm, and the camera height 409 is 250 cm.

From FIGS. 5A and 5B, in order to change the shift amount 402 by a constant amount, a control needs to be made such that the target focus-control distance 404 is controlled at a constant speed, and the target tilt-control angle 405 is controlled to become faster as the shift amount 402 increases. In the focus control, it is the absolute distance of the object to be focused that changes at a constant speed.

When the pulse control is performed by a stepping motor or the like, it is necessary to determine the driving speed of the focus lens 102 based on the relationship between the absolute distance and the number of pulses.

A detailed description will be given of each embodiment.

First Embodiment

A description will be given of a first embodiment according to the present invention. As illustrated in FIGS. 5A and 5B, when the focus lens 102 and the image sensor 106 are driven without considering the respective driving speeds, the focal plane tilts while they are being driven, and the captured image in an unnatural focus range is provided to the user. According to this embodiment, the user inputs the shift amount 402 from the reference plane 401 as an arbitrary value (input value). Thereby, even for a captured image while each of the focus lens 102 and the image sensor 106 is being driven, a shift change control of the focal plane can be made in a substantially vertical direction while maintaining the focal plane parallel to the reference plane 401.

Figure 6:
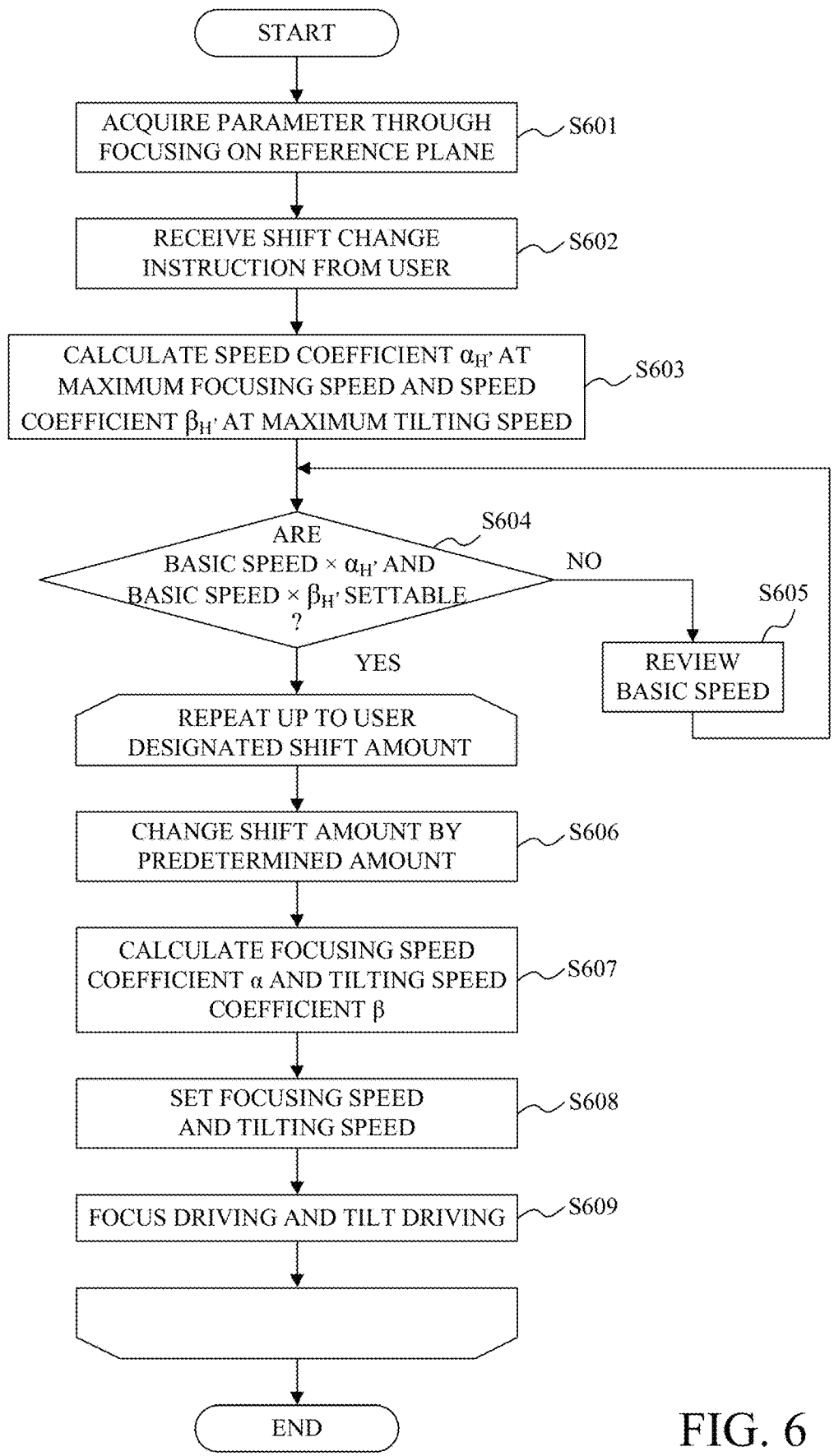
FIG. 6 is a flowchart showing a control method according to a first embodiment.

Referring now to FIG. 6, a description will be given of processing (control method) executed by the image pickup apparatus 100 according to this embodiment. FIG. 6 is a flowchart showing the control method according to this embodiment. The steps in FIG. 6 are mainly executed by the focusing speed calculator 115, the tilting speed calculator 116, and the focal plane controlling unit 117.

First, in the step S601, the focal plane controlling unit 117 acquires parameters necessary to change the shift of the focal plane by focusing on the reference plane 401. The necessary parameters herein are the object distance 406 during the reference plane control, the focal length 407, the camera depression angle 408, and the camera height 409. The parameter for focusing on the reference plane 401 can be calculated and acquired based on the expression (3) as described above. However, the parameter acquiring method is not limited to this embodiment. For example, any method can be used such as a method of calibrating the image pickup apparatus 100 during installation, a method of using a sensor built in the image pickup apparatus 100 or an external sensor, or a method of using a value input by the user.

Next, in the step S602, the change instruction receiving unit 112 receives a shift change instruction from the user. According to this embodiment, the shift change instruction is given as a value of the shift amount 402.

Next, in the step S603, the focusing speed calculator 115 and the tilting speed calculator 116 calculate a speed coefficient $\alpha_H$ at the maximum focusing speed and a speed coefficient $\beta_H$ at the maximum tilting speed, respectively. The focusing speed and the tilting speed with a certain shift amount 402 may be determined based on the slopes in the graphs illustrated in FIGS. 5A and 5B. Hence, the calculations of the speeds employ a first-order differentiation expression of the expressions (1) and (2) with the shift amount 402. Expressions obtained by first-order differentiating the expressions (1) and (2) are expressed as the following expressions (4) and (5), respectively.

$$\frac{\partial D}{\partial H_s} = -\frac{1}{\sin a} = -\frac{D_0}{H} \quad (4)$$

$$\frac{\partial b}{\partial H_s} = \frac{-f \cos a}{(H - H_s)^2 + f^2 \cos^2 a} \quad (5)$$

$$= \frac{-D_0 f \sqrt{D_0^2 - H^2}}{D_0^2(H - H_s)^2 + f^2(D_0^2 - H^2)}$$

The object distance 406 during the reference plane control, the focal length 407, the camera depression angle 408 or the camera height 409 acquired in the step S601, and the shift amount set in the step 606 (set value of the shift amount) are substituted for the expressions (4) and (5). Thereby, the focusing speed and the tilting speed at the certain shift amount 402 can be calculated. Regarding the various speed coefficients calculated herein, the speed coefficient $\alpha_H$ at the maximum focusing speed and the speed coefficient $\beta_H$ at the maximum tilting speed are values calculated with the maximum shift amount. By calculating the speed coefficient $\alpha_H$ at the maximum focusing speed and the speed coefficient $\beta_H$ at the maximum tilting speed, and by setting the speed as fast as possible in the subsequent speed setting, the shift change from the reference plane 401 to the focal plane 403 at the desired height can be completed in a short time.

Next, in the step S604, the focal plane controlling unit 117 determines whether or not the focusing speed (basic speed× $\alpha_H$) and the tilting speed (basic speed×$\beta_H$) determined based on the speed coefficients $\alpha_H$ and $\beta_H$ calculated in the step S603, respectively, are settable speeds. When it is determined in the step S604 that at least one of the focusing speed and the tilting speed is not the settable speed, the flow proceeds to the step S605. In the step S605, the focal plane controlling unit 117 reviews the basic speed and returns to the step S604. On the other hand, if it is determined in the step S604 that the focusing speed and the tilting speed are settable speeds, the flow proceeds to the step S606.

Processing in steps S606 to S609 is repeated until the shift amount received in the step S602 and the current shift amount (set value of the shift amount) coincide with each other. First, in the step S606, the focusing speed calculator 115 and the tilting speed calculator 116 change the shift amount by a predetermined fixed amount (a predetermined amount). Next, in the step S607, the focusing speed calculator 115 and the tilting speed calculator 116 calculate the focusing speed coefficient $\alpha$ and the tilting speed coefficient $\beta$ at the shift amount set in the step S606, by using the expressions (4) and (5), respectively.

Next, in the step S608, the focusing speed calculator 115 and the tilting speed calculator 116 calculate the focusing speed and the tilting speed by multiplying the basic speed by the focusing speed coefficient $\alpha$ and the tilting speed coefficient $\beta$, and sets them to the focal plane controlling unit 117. Next, in the step S609, the focal plane controlling unit 117 drives the focus lens 102 and the image sensor 106, respectively, in accordance with the focusing speed and the tilting speed set in the step S608. When the focus driving and the tilt driving are completed up to the target focus-control distance 404 and the target tilt-control angle 405 calculated by the expressions (1) and (2) in accordance with the current shift amount, the flow returns to the step S606 again to repeat the processing.

This embodiment sets the shift amount every necessary time, but is not limited to this example, and a table showing a relationship among the shift amount, the focusing speed, and the tilting speed may be stored and a control may be made based on the table. Instead of setting the shift amount, either the focus driving or the tilt driving may be made at an arbitrary speed, and the other driving speed may be synchronized so that the focal plane moves in a substantially vertical direction while a substantially parallel state is maintained.

This embodiment considers the driving speeds of the focus lens 102 and the image sensor 106, and controls (moves) the focal plane so that the focal plane is shifted in a substantially vertical direction while it is maintained parallel to the reference plane 401.

Second Embodiment

Figure 7A:
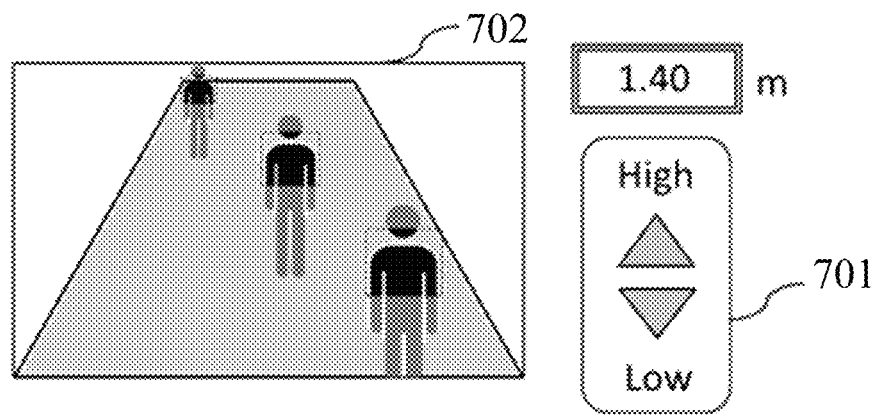
FIGS. 7A and 7B explain an operation screen according to second and third embodiments.
Figure 7B:
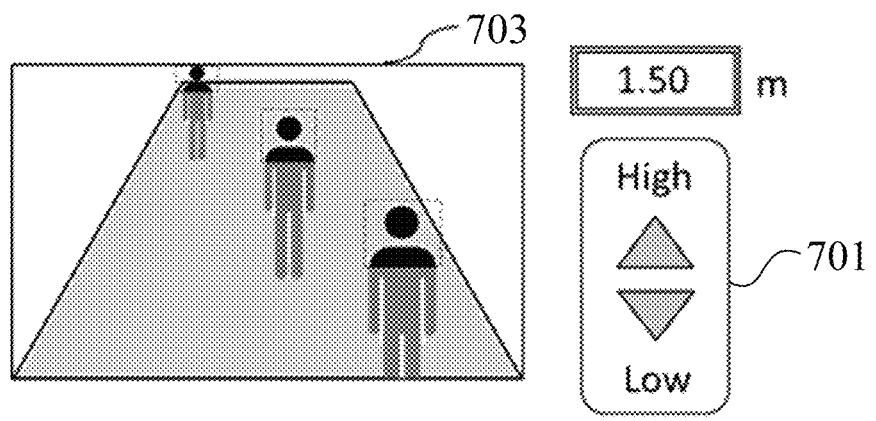

Next follows a description of a second embodiment according to the present invention. This embodiment describes a control in which a shift change instruction from the user is received by the user pressing a shift change button 701 as illustrated in FIGS. 7A and 7B. In other words, the change instruction receiving unit 112 according to this embodiment receives the change instruction from the shift change button 701.

FIGS. 7A and 7B explain an operation screen for the user to provide the shift change of the focal plane by pressing the shift change button 701. As illustrated in FIGS. 7A and 7B, the height of the focal plane is changed by a predetermined amount by pressing either the "High" or "Low" button of the shift change button 701. The current set value of the shift amount may be displayed on the operation screen. In a scene 702 illustrated in FIG. 7A, an area around person's shoulder is in focus and the face height is an area to be watched, and blurring occurs in the addressed area. Accordingly, by pressing "High" of the shift change button 701, the shift is changed in the direction of increasing the height of the focal plane. Thereby, the captured image is in focus on the face height, which is the watched area, and the scene 703 illustrated in FIG. 7B can be obtained. In the shift change of the focal plane according to this embodiment, the user does not need to input a value of the shift amount 402, and utilizes intuitive operations. It is effective in a scene in which fine adjustment of the shift amount is required, such as a scene with a narrow depth.

Figure 8:
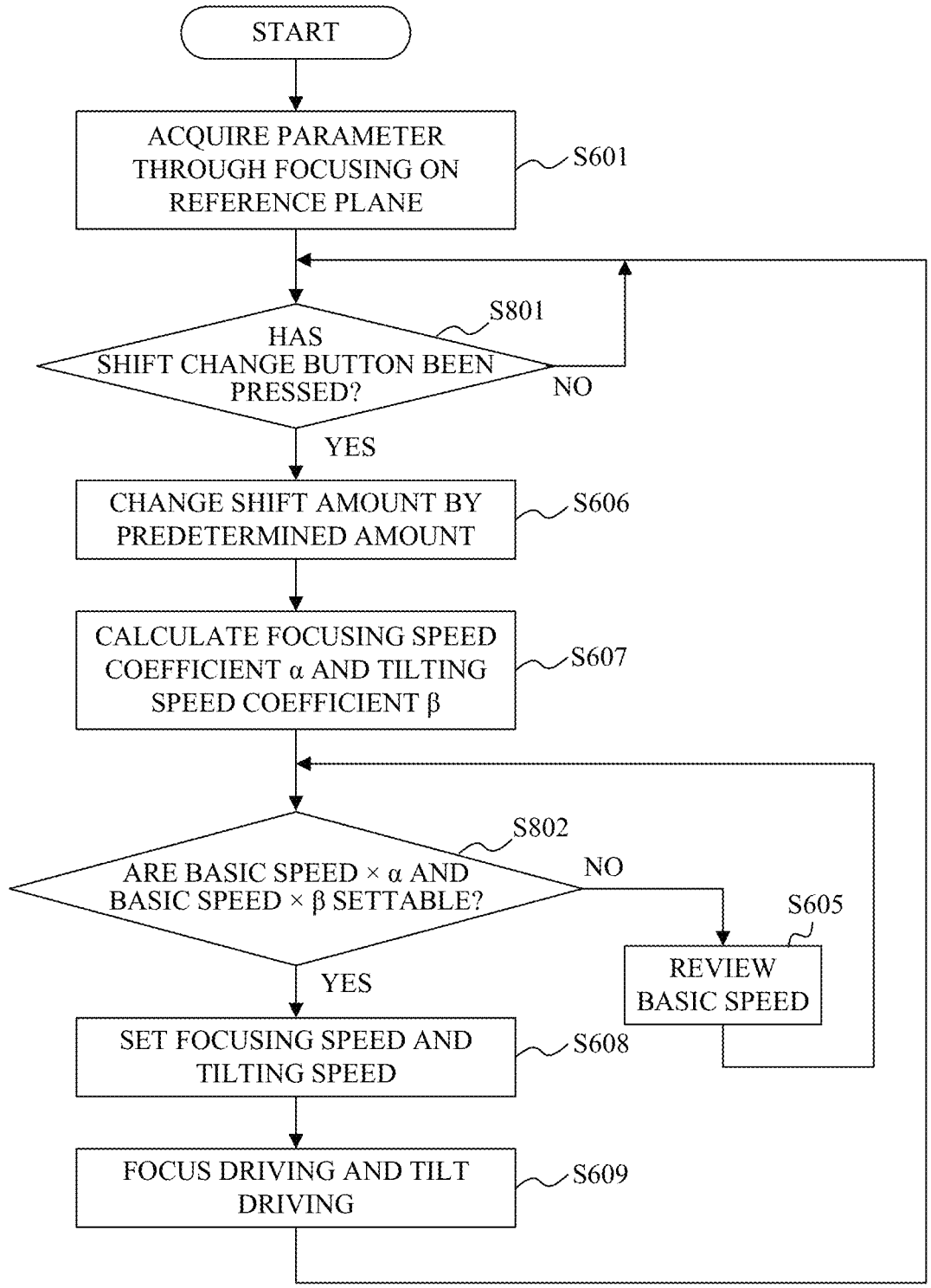
FIG. 8 is a flowchart showing a control method according to a second embodiment.

Referring now to FIG. 8, a description will be given of processing (control method) executed by the image pickup apparatus 100 according to this embodiment. FIG. 8 is a flowchart showing the control method according to this embodiment. The steps in FIG. 8 are mainly executed by the focusing speed calculator 115, the tilting speed calculator 116, and the focal plane controlling unit 117. The steps S601 and S605 to S609 in FIG. 8 are common to those in the first embodiment described with reference to FIG.6, and a description thereof will be omitted.

After the focal plane controlling unit 117 acquires the parameters in the step S601, the change instruction receiving unit 112 determines in the step S801 whether or not the shift change button 701 has been pressed. After the subsequent steps S606 and S607, the flow proceeds to the step S802. In the step S802, the focal plane controlling unit 117 determines whether or not the focusing speed and the tilting speed determined based on the focusing speed coefficient $\alpha$ and the tilting speed coefficient $\beta$ calculated in the step S607 are settable speeds. In this embodiment, the focusing speed and the tilting speed in the shift change of the focal plane by pressing the shift change button 701 may be set to low speeds in order to facilitate the fine adjustment by the user.

If at least one of the focusing speed and the tilting speed is not the settable speed in the step S802, the flow proceeds to the step S605 and returns to the step S802. On the other hand, when the focusing speed and the tilting speed are settable speeds in the step S802, the flow proceeds to the step S608, and returns to the step S801 after the step S609.

This embodiment sets the shift amount every necessary time similar to the first embodiment, but is not limited to this example, and a table showing a relationship among the shift amount, the focusing speed, and the tilting speed may be stored and a control may be made based on the table. Instead of setting the shift amount, either the focus driving or the tilt driving may be made at an arbitrary speed, and the other driving speed may be synchronized so that the focal plane moves in a substantially vertical direction while a substantially parallel state is maintained.

This embodiment can make a control, when the shift change button 701 is pressed, such that the focal plane is shifted in the substantially vertical direction while the focal plane is maintained parallel to the reference plane, and simplifies the shift changing operation of the focal plane.

Third Embodiment

Next follows a description of a third embodiment according to the present invention. This embodiment makes a control that adds processing for providing a predetermined slope permissible width, when the focal plane in the second embodiment is tilted from the state of being completely parallel to the reference plane 401.

FIGS. 9A and 9B illustrate a relationship between a conventional depth range and a tilting depth range. The tilting depth range is expanded from a tilting depth range 911 to a tilting depth range 919 with a shallow depth indicated by a conventional depth range 903 in FIG. 9A to a tilting depth range 919 with a deep depth indicated by a conventional depth range 912 in FIG. 9B. The tilting depth range 911 is an area between two planes of a front tilting depth plane 907 and a back tilting depth plane 908. The tilting depth range 919 is an area between two planes of a front tilting depth plane 915 and a back tilting depth plane 916. The front tilting depth planes 907 and 915 and the back tilting depth planes 908 and 916 are shown by planes made by connecting, to a Scheimpflug point 902, each of the intersections 909, 910, 917, and 918 of the conventional front depth planes 905 and 913 and the conventional back depth planes 906 and 914 with an optical axis 901. Thus, since the tilting depth range also varies in accordance with the conventional depth range, the slope permissible width of the focal plane may be determined in accordance with the conventional depth range determined by the object distance, the focal length, and the F-number (diaphragm).

Figure 10A:
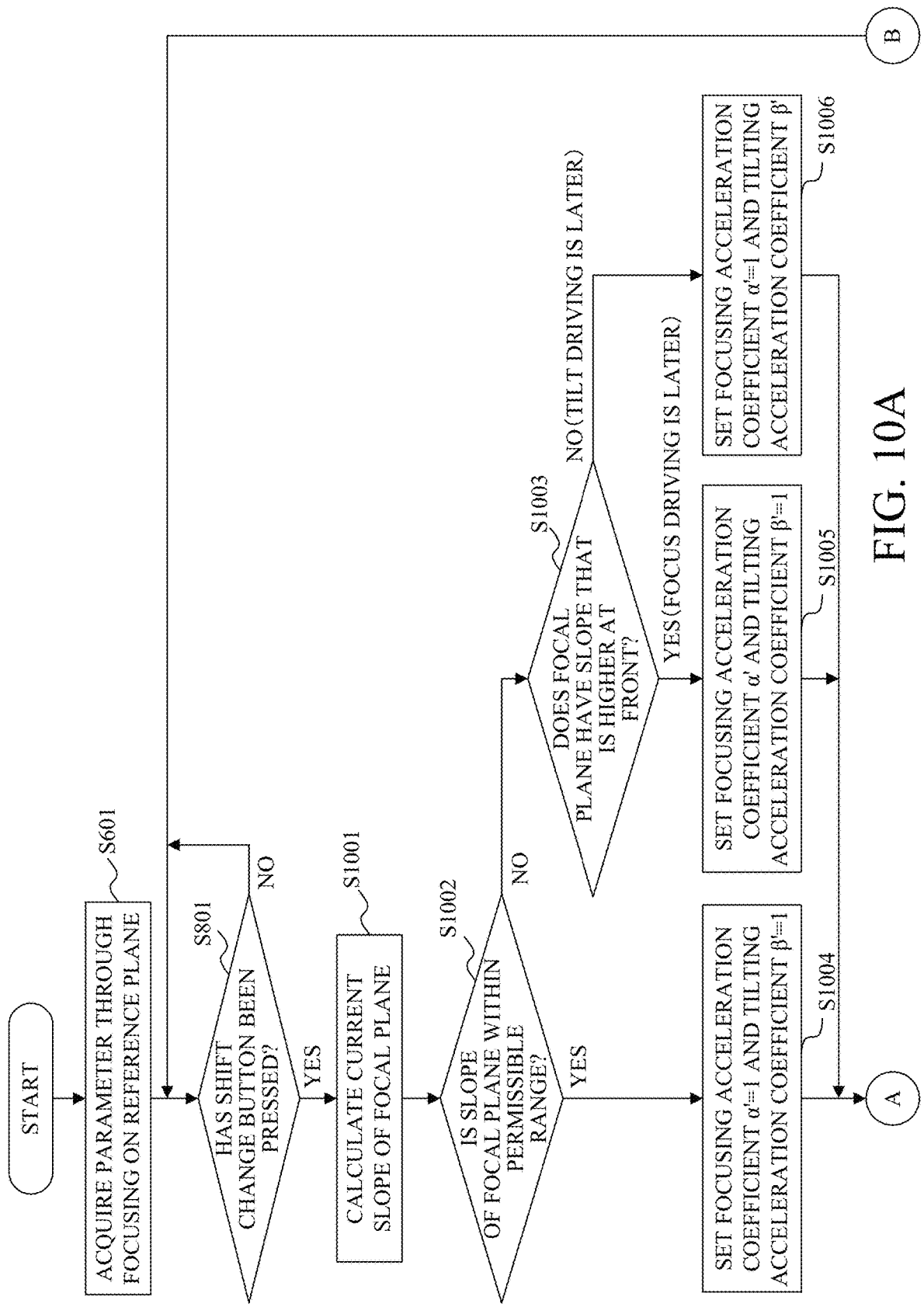
FIGS. 10A and 10B are a flowchart showing a control method according to a third embodiment.
Figure 10B:
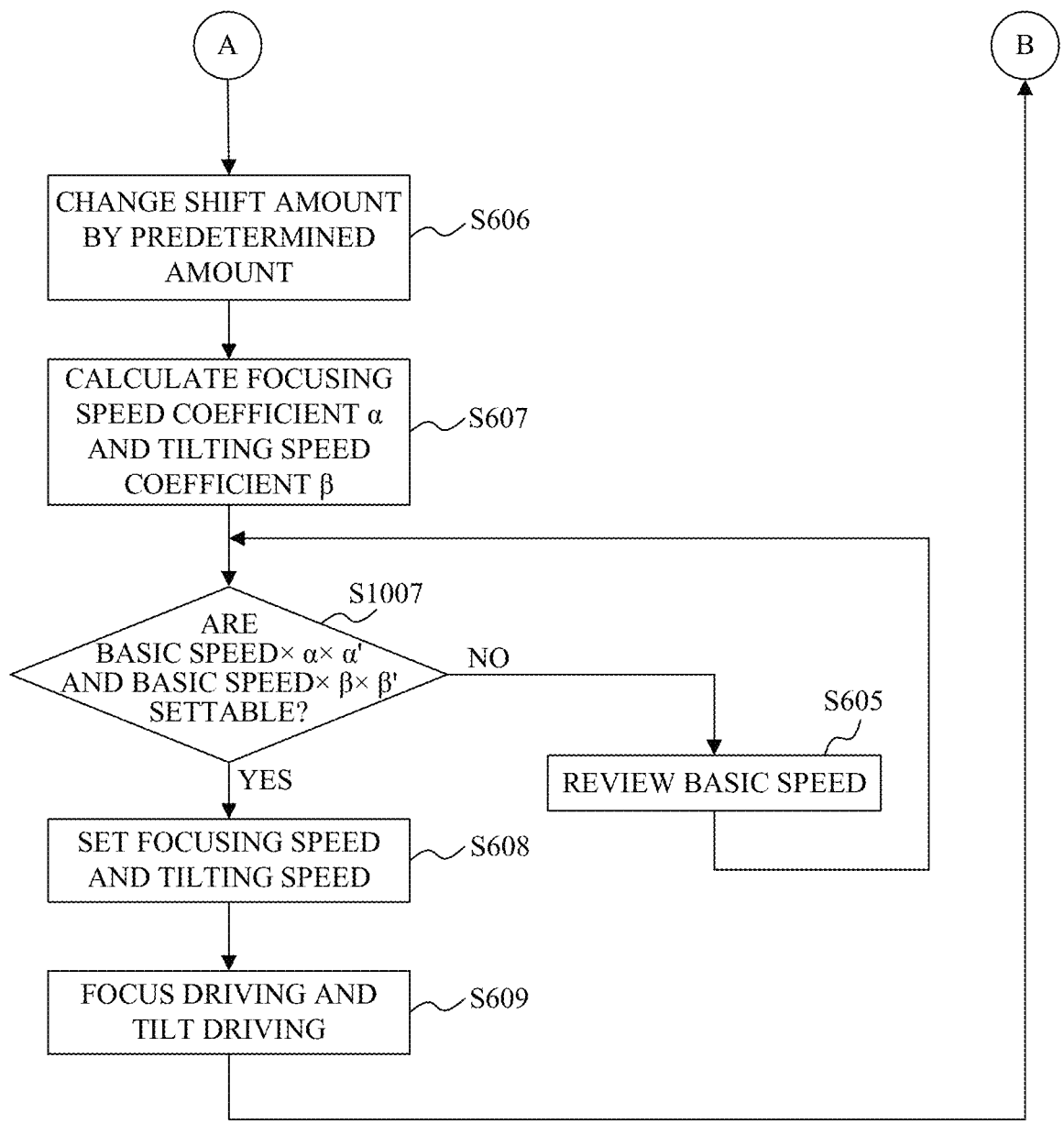

Referring now to FIGS. 10A and 10B, a description will be given of processing (control method) executed by the image pickup apparatus 100 according to this embodiment. FIGS. 10A and 10B are flowcharts showing the control method according to this embodiment. Each step in FIGS. 10A and 10B is mainly executed by the focusing speed calculator 115, the tilting speed calculator 116, and the focal plane controlling unit 117. The steps S601, S605 to S609, and S801 in FIGS. 10A and 10B are the same as those in the first or second embodiment described with reference to FIG. 6 or 8.

After the steps S601 and S801, in the step S1001, the focal plane controlling unit 117 calculates the current slope of the focal plane. The current slope of the focal plane is calculated based on a shift amount between the current tilt angle and the tilt angle 410 during the reference plane control, and a shift amount between the current focal length and the object distance 406 during the reference plane control. Next, in the step S1002, the focal plane controlling unit 117 determines whether or not the current slope of the focal plane calculated in the step S1001 is within the permissible range (within a range of the slope permissible width). In this embodiment, the slope permissible width is determined in accordance with the conventional depth range calculated based on at least one of the object distance, the focal length, and the F-number. When it is determined that the current slope of the focal plane is not within the permissible range, the flow proceeds to the step S1003.

Figure 11A:
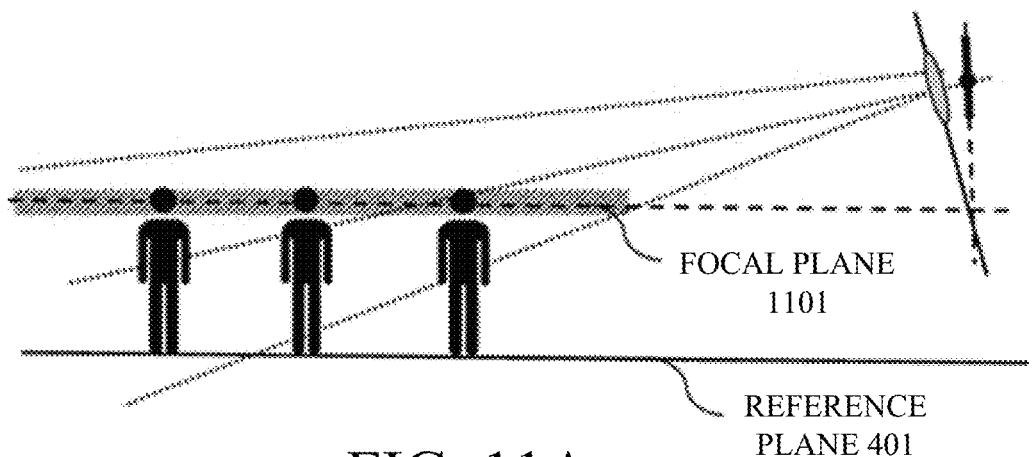
FIGS. 11A through 11C illustrate a state of a focal plane according to the third embodiment.
Figure 11B:
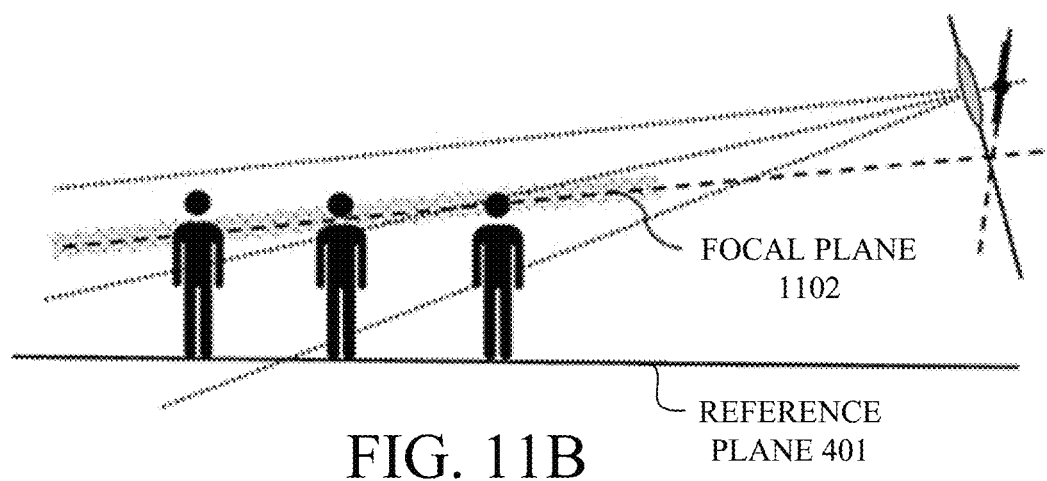
Figure 11C:
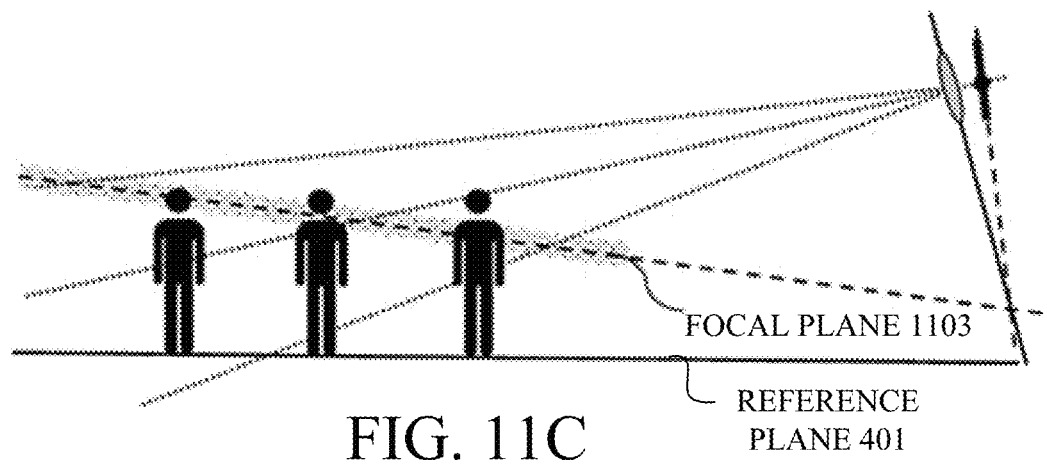

In the step S1003, the focal plane controlling unit 117 determines whether the front or back of the focal plane rises. FIGS. 11A and 11C illustrate possible states of the focal plane in its shift control. The focal plane 1101 illustrated in FIG. 11A is a focal plane parallel to the reference plane 401. On the other hand, focal planes 1102 and 1103 illustrated in FIGS. 11B and 11C are focal planes inclined to the reference plane 401. When the position of the focal plane in the vertical direction relative to the reference plane becomes higher as the distance becomes shorter like the focal plane 1102 (when the front of the focal plane rises or is higher), the focus driving is later than the tilt driving. On the other hand, when the position of the focal plane in the vertical direction relative to the reference plane becomes lower as the distance becomes shorter like the focal plane 1103 (when the back of the focal plane rises or is higher), the tilt driving is later than the focus driving. It is therefore possible to determine whether the focus driving is later or the tilt driving is later by determining whether the front or back of the focal plane rises. If the front of the focal plane rises (when focus driving is later), the flow advances to the step S1005. On the other hand, when the back of the focal plane rises (when the tilt driving is later), the flow proceeds to the step S1006.

If it is determined in the step S1002 that the slope of the focal plane is within the permissible range, the flow proceeds to the step S1004. In the step S1004, the focal plane controlling unit 117 sets 1 to a focusing acceleration coefficient $\alpha'$ and a tilting acceleration coefficient $\beta'$ ($\alpha'=\beta'=1$). When the slope of the focal plane is within the permissible range, it is unnecessary to accelerate the focus driving and tilt driving. Hence, the focal plane controlling unit 117 sets a coefficient that accelerates none of them.

If it is determined in the step S1002 that the slope of the focal plane is not within the permissible range and that the front of the focal plane rises in the step S1003, the focal plane controlling unit 117 sets the focusing acceleration coefficient $\alpha'$ in the step S1005. The focal plane controlling unit 117 sets 1 to the tilting acceleration coefficient $\beta'$ ($\beta'=1$). Since the focus driving is later now, a coefficient ($\alpha'>1$) for accelerating the focus driving is set to the focusing acceleration coefficient $\alpha'$.

If it is determined in the step S1002 that the slope of the focal plane is not within the permissible range and it is determined in the step S1003 that the front of the focal plane does not rise, the focal plane controlling unit 117 sets 1 to the focus acceleration coefficient $\alpha'$ in the step S1006. The focal plane controlling unit 117 sets the tilting acceleration coefficient $\beta'$. Since the tilt driving is later, a coefficient ($\beta'>1$) for accelerating the tilt driving is set to the tilt acceleration coefficient $\beta'$.

After any of the steps S1004, S1005, and S1006, the flow proceeds to the step S1007 via the steps S606 and S607. In the step S1007, the focal plane controlling unit 117 determines the focusing speed (basic speed×$\alpha$×$\alpha'$) and the tilting speed (basic speed×$\beta$×$\beta'$) based on the focusing speed coefficient $\alpha$, the tilting speed coefficient $\beta$, the focusing acceleration coefficient $\alpha'$, and the tilting acceleration coefficient $\beta'$. Then, the focal plane controlling unit 117 determines whether or not the focusing speed and the tilting speed are settable speeds. This embodiment may set the focusing speed and the tilting speed to low speeds in order to facilitate the fine adjustment by the user, similar to the second embodiment.

If at least one of the focusing speed and the tilting speed is not the settable speed in the step S1007, the flow proceeds to the step S605 and returns to the step S1007. On the other hand, if the focusing speed and the tilting speed are settable in the step S1007, the flow proceeds to the step S608, and returns to the step S801 via the step S609.

This embodiment sets the shift amount every necessary time similar to the first and second embodiments, but is not limited to this example, and may store a table showing a relationship among the shift amount, the focusing speed, and the tilting speed, and make a control based on the table. Instead of setting the shift amount, either the focus driving or the tilt driving may be made at an arbitrary speed, and the other driving speed may be synchronized so that the focal plane moves in a substantially vertical direction while a substantially parallel state is maintained.

This embodiment can make a shift change of the focal plane in consideration of the depth.

Thus, in each embodiment, the control apparatus (image pickup apparatus 100) includes the tilt driving unit (image sensor driving unit 119), the focus driving unit 118, and the focal plane controlling unit 117. The tilt driving unit changes the tilt of at least one of the image sensor 106 and the imaging optical system to perform tilt driving. The focus driving unit moves the focus lens 102 that constitutes at least part of the imaging optical system in the optical axis direction to perform the focus driving. The focal plane controlling unit 117 controls the focus driving unit and the tilt driving unit to move the focal plane. The focal plane controlling unit moves the focal plane in the vertical (or perpendicular) direction (substantially vertical direction) of the focal plane while maintaining the focal plane in parallel (substantially parallel) to the predetermined surface (reference plane 401). The term "substantially parallel or substantially vertical" is not limited to being strictly parallel or vertical, but intends to cover being evaluated as substantially parallel or vertical.

Assume that the focal plane at the start of movement is a first focal plane, and the focal plane parallel to the first focal plane and having a different vertical position is the second focal plane. Then, the focal plane controlling unit may change the shift amount of the second focal plane relative to the first focal plane (difference between the position of the first focal plane and the position of the second focal plane) to move the second focal plane in the vertical direction while the state of being parallel to the first focal plane is maintained. The control apparatus may include a focusing speed determining unit (focusing speed calculator 115) that determines the focusing speed, and a tilting speed determining unit (tilting speed calculator 116) that determines the tilting speed. The focusing speed determining unit and the tilting speed determining unit may determine the focusing speed and the tilting speed so as to move the focal plane in the vertical direction while keeping the focal plane parallel to the predetermined surface.

The focusing speed determining unit may calculate the focusing speed coefficient based on the relationship between the shift amount and the target focus-control distance that varies depending on the shift amount, and determines the focusing speed based on the focusing speed coefficient. The tilting speed determining unit may calculate the tilting speed coefficient based on the relationship between the shift amount and the target tilt-control angle that changes depending on the shift amount, and determine the tilting speed based on the tilting speed coefficient. The focusing speed determining unit and the tilting speed determining unit may calculate the focusing speed coefficient and the tilting speed coefficient based on at least one of the height and the depression angle of the image pickup apparatus (camera), the object distance, and the focal length.

The focal plane controlling unit may change the shift amount based on the input value input by the user (first method). The focal plane controlling unit may change the shift amount based on a user's shift amount changing operation (such as pressing the shift change button 701) (second method). The focusing speed determining unit and the tilting speed determining unit respectively may determine the focusing speed and the tilting speed that are higher in the first method than those in the second method.

The focal plane controlling unit may control the second focal plane such that the slope of the second focal plane to the surface parallel to the first focal plane is within the permissible range (within the slope permissible width). The focal plane controlling unit may determine the permissible range (slope permissible width) according to the depth calculated based on at least one of the object distance, the focal length, and the F-number.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiments can provide a control apparatus, a control method, and a storage medium, each of which can move the focal plane in the vertical direction while keeping the reference plane and the focal plane parallel to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156348, filed on Aug. 29, 2019, which is hereby incorporated by reference herein in its entirety.

What is claimed is:

1. A control apparatus comprising:
a hardware processor; and
a memory for storing instructions to be executed by the hardware processor, wherein, when the instructions stored in the memory are executed by the hardware processor, the control apparatus functions as:
a tilt driving unit configured to perform tilt driving at least one of an image sensor and an imaging optical system relative to a plane orthogonal to an optical axis;
a focus driving unit configured to perform focus driving by moving a focus lens that constitutes at least part of the imaging optical system in an optical axis direction;
a controlling unit configured to control the focus driving unit and the tilt driving unit;
a focusing speed determining unit configured to determine a focusing speed of the focus lens in moving the focus lens in the optical axis direction; and
a tilting speed determining unit configured to determine a tilting speed in changing a tilt of at least one of the image sensor and the imaging optical system relative to the plane orthogonal to the optical axis,
wherein after the controlling unit controls the focus driving unit and the tilt driving unit so as to focus a first plane, the controlling unit controls the focus driving unit and the tilt driving unit so as to focus a second plane that is parallel to the first plane and having a different position in a vertical direction;
wherein the controlling unit changes a position of a focal plane by a predetermined amount in the vertical direction while maintaining the focal plane parallel to the first plane, and focuses the second plane,
wherein the focusing speed determining unit and the tilting speed determining unit determine the focusing speed and the tilting speed so as to move the focal plane in the vertical direction while maintaining the focal plane parallel to the first plane, and
wherein the tilting speed increases as the focal plane approaches the second plane.

2. The control apparatus according to claim 1, wherein the focusing speed determining unit calculates a focusing speed coefficient based on a relationship between a shift amount and a target focus-control distance that varies depending on the shift amount, the shift amount being a distance between the first plane and the second plane, and
wherein the focusing speed determining unit determines the focusing speed based on the focusing speed coefficient.

3. The control apparatus according to claim 2, wherein the tilting speed determining unit calculates a tilting speed coefficient based on a relationship between the shift amount and a target tilt-control angle that varies depending on the shift amount, and
wherein the tilting speed determining unit determines the tilting speed based on the tilting speed coefficient.

4. The control apparatus according to claim 3, wherein the focusing speed determining unit and the tilting speed determining unit calculate the focusing speed coefficient and the tilting speed coefficient based on at least one of a height and a depression angle of an image pickup apparatus, an object distance, and a focal length.

5. The control apparatus according to claim 2, wherein the controlling unit changes the shift amount based on an input value input by a user.

6. The control apparatus according to claim 2, wherein the controlling unit changes the shift amount based on a changing operation of the shift amount by a user.

7. The control apparatus according to claim 2, wherein the controlling unit uses a first method of changing the shift amount based on an input value input by a user, and a second method of changing the shift amount based on a changing operation of the shift amount by the user, and
wherein the focusing speed determining unit and the tilting speed determining unit respectively determine the focus driving speed and the tilting speed of the first method that are higher than that of the second method.

8. The control apparatus according to claim 1, wherein the controlling unit controls the second plane so that a slope of the second plane relative to a plane parallel to the first plane is within a permissible range.

9. The control apparatus according to claim 8, wherein the controlling unit determines the permissible range according to a depth calculated based on at least one of an object distance, a focal length, and an F-number.

10. A control method for controlling a control apparatus, the control method comprising:
performing tilt driving at least one of an image sensor and an imaging optical system relative to a plane orthogonal to an optical axis;
performing focus driving by moving a focus lens that constitutes at least part of the imaging optical system in an optical axis direction;
controlling the focus driving and the tilt driving;
determining a focusing speed of the focus lens in moving the focus lens in the optical axis direction;
determining a tilting speed in changing a tilt of at least one of the image sensor and the imaging optical system relative to the plane orthogonal to the optical axis; and
after the focus driving and the tilt driving are performed so as to focus a first plane, controlling the focus driving and the tilt driving so as to focus a second plane that is parallel to the first plane and having a different position in a vertical direction,
wherein a position of a focal plane is changed by a predetermined amount in the vertical direction while maintaining the focal plane parallel to the first plane, and the second plane is focused,
wherein the focusing speed and the tilting speed are determined so as to move the focal plane in the vertical direction while maintaining the focal plane parallel to the first plane, and
wherein the tilting speed increases as the focal plane approaches the second plane.

11. A non-transitory computer-readable storage medium storing a program for causing a computer to execute a control method for controlling a control apparatus,
wherein the control method includes:
performing tilt driving at least one of an image sensor and an imaging optical system relative to a plane orthogonal to an optical axis;
performing focus driving by moving a focus lens that constitutes at least part of the imaging optical system in an optical axis direction;
controlling the focus driving and the tilt driving;
determining a focusing speed of the focus lens in moving the focus lens in the optical axis direction;
determining a tilting speed in changing a tilt of at least one of the image sensor and the imaging optical system relative to the plane orthogonal to the optical axis; and after the focus driving and the tilt driving are performed so as to focus a first plane, controlling the focus driving and the tilt driving so as to focus a second plane that is parallel to the first plane and having a different position in a vertical direction, wherein a position of a focal plane is changed by a predetermined amount in the vertical direction while maintaining the focal plane parallel to the first plane, and focuses the second plan, wherein the focusing speed and the tilting speed are determined so as to move the focal plane in the vertical direction while maintaining the focal plane parallel to the first plane, and wherein the tilting speed increases as the focal plane approaches the second plane.

12. The control apparatus according to claim 1, wherein the controlling unit changes the position of the focal plane by the predetermined amount until a shift amount reaches a distance between the first plane and the second plane.

* * * * *